UNITED STATES PATENT OFFICE.

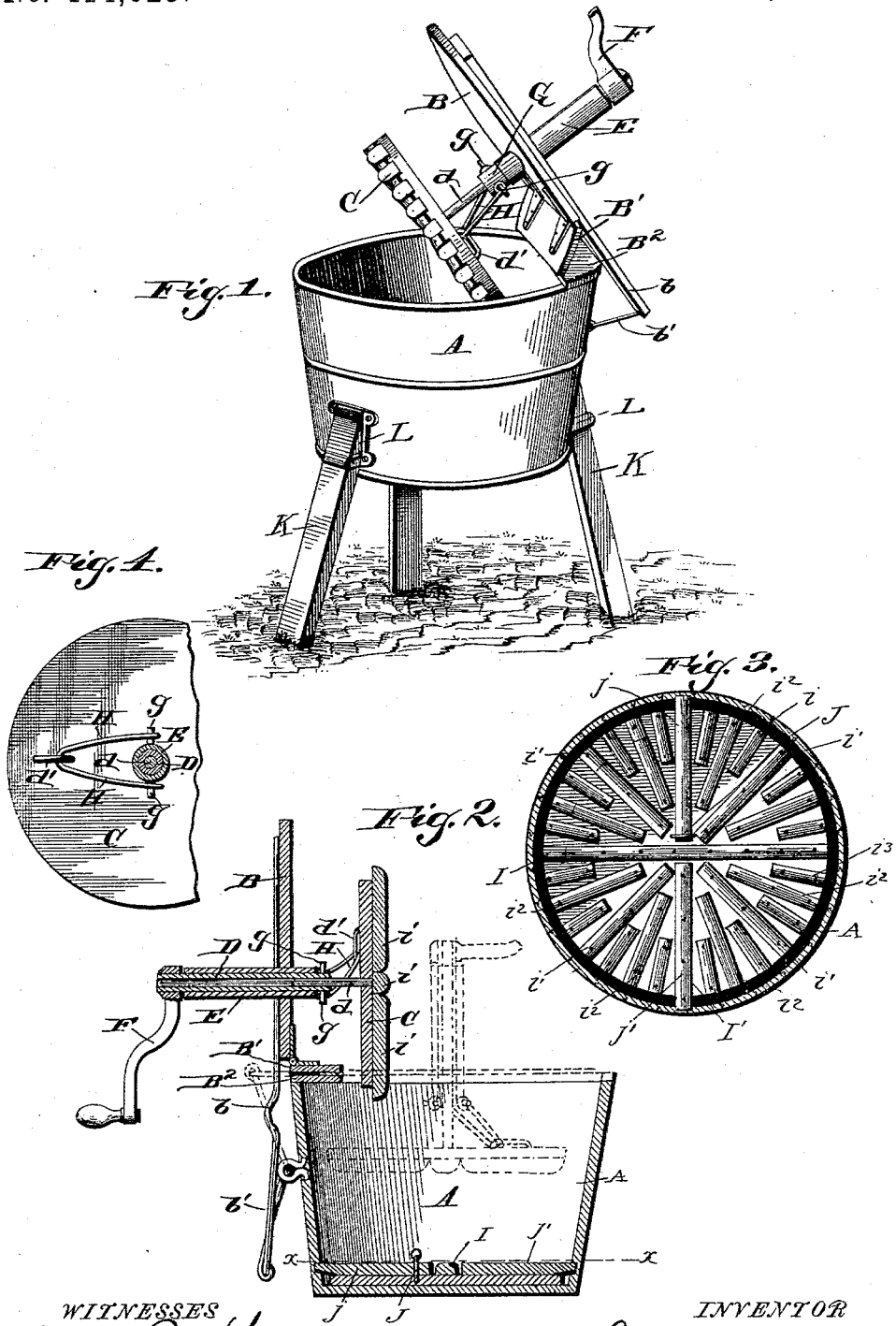

GEORGE W. WINTERS, OF KNOXVILLE, IOWA.

WASHING-MACHINE.

SPECIFICATION forming part of Letters Patent No. 414,623, dated November 5, 1889.

Application filed December 4, 1888. Serial No. 292,608. (No model.)

*To all whom it may concern:*

Be it known that I, GEORGE W. WINTERS, a citizen of the United States, residing at Knoxville, in the county of Marion and State of Iowa, have invented certain new and useful Improvements in Washing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to washing-machines which have a fixed and a rotatable rubber, the latter being journaled to the cover and adapted to accommodate itself to the bulk of clothing in the tub or vessel.

The object of the invention is to simplify the construction of the machine and increase its efficiency, and to provide a machine that can be readily cleaned.

The improvement consists of the details of construction, which hereinafter will be more fully described and claimed, and shown in the annexed drawings, in which—

Figure 1 is a perspective view of a washing-machine embodying my invention; Fig. 2, a vertical central sectional view showing the cover closed by dotted lines and thrown up by full lines; Fig. 3, a horizontal section on the line $x\ x$ of Fig. 2, and Fig. 4 a detail view showing the link-connection between the rotatable rubber and the vertical shaft.

The vessel A, of convenient size and ordinary shape, is provided with a cover that is made in three parts B, B', and B². The part B² is fixed to the vessel, and the parts B and B' are hinged to one another and to the part B², substantially as shown. The parts B' and B² are approximately of the same width, so that the part B' can rest upon the part B² and have the edges of the two parts about in the same vertical planes. The part B, which covers about three-fourths of the vessel, is provided with the reach $b$, which extends horizontally from the rear thereof beyond the edge of the part B², and is connected by the link $b'$ with the side of the vessel. The reach and the link are so disposed and proportioned that the part B can close down on the vessel, and will stand vertically when thrown up, as shown most clearly in Fig. 2.

The rotatable rubber C is provided with the stem $d$ and with the staple or guide $d'$, the latter being secured thereto in any well-known manner, preferably by having its ends passed through the rubber and clinched. The stem $d$ telescopes with the tubular bearing-sleeve D, that is journaled in the vertical bearing E, secured to the part B. The tubular bearing-sleeve D is provided at its upper end with the crank F, by which it is rotated, and at its lower end with the head G, which has arms $g$ diametrically opposite each other. The connection H between the head G and the rubber C is approximately $\mathsf{U}$ shape, and has its closed end embracing the staple or guide $d'$, and its free ends fitted to the arms $g\ g$. The lower end of the connection H can move on the rubber C, and admits of the rubber rising and falling to accommodate itself to the bulk of the clothing in the vessel. The stationary rubber in the bottom of the vessel is the counterpart of the rotatory rubber C, except in one or two details; hence a description of one will suffice for both. The ribs that form the rubbing-surface are composed of strips, which are arranged as follows: The strips I and I' extend from one edge of the rubber to the other, being arranged at right angles to one another. The strip I' is composed of two halves $j$ and $j'$, which are extended at their ends and fit in sockets in the sides of the tub to hold the rubber in place and against rotatory movement. The strip $j'$ is fixed, and the strip $j$ is movable, being held down at its inner end by the stirrup J. The intermediate strips $i'$ extend from the angles between the strips I and I' to the edge of the rubber. The strips $i^2$ are arranged between the strip I or I' and $i'$, and do not extend quite to the center of the rubber. The short strips $i^3$ are arranged between the strips I or I' and $i'$ and $i^2$.

In the rubber C the ends of the strips I' will not project, as shown in Figs. 2 and 3, and both halves $j$ and $j'$ will be secured in place. A space is left between the edge of the bottom rubber and the sides of the tub to receive the sediment. The bottom rubber can be readily removed for cleaning or other purposes.

It will be observed that the tub is mounted on legs K, which may be secured thereto in any well-known manner, preferably by having their upper ends fitted in castings L, which are secured to the sides of the tub so that they can be readily removed, to be replaced by longer or shorter legs, or for any purpose required.

The operation of the machine must be obvious to any one skilled in the art to which this invention appertains from the foregoing detailed description, reference being had to the accompanying drawings.

Having thus described my invention, what I claim, and desire to secure by Letters Patent, is—

1. In a washing-machine, the herein-described cover, composed of three sections hinged to one another, the outer section $B^2$ secured to the vessel, and the reach extending from the said section B and connected with the vessel by the link $b'$, substantially as and for the purpose described.

2. In a washing-machine, the combination of the cover having a vertical bearing, the rotatory beater having a stem, the tubular bearing telescoping with the stem, the connection H, connecting the said beater with the said tubular bearing, and the keeper forming a loose and positive connection between the rubber and the said connection H, substantially as and for the purpose described.

3. The combination, with the tub having sockets in its sides, of the rubber placed on the bottom of the tub, the strips $j$ and $j'$, having their ends extended and fitted in the said sockets, and the stirrup for holding the inner end of the strip $j$ down, substantially as and for the purpose described.

In testimony whereof I affix my signature in presence of two witnesses.

GEORGE W. WINTERS.

Witnesses:
G. L. BOYDSTON,
O. J. KENDIG.